(12) United States Patent
Haque

(10) Patent No.: US 8,617,270 B2
(45) Date of Patent: Dec. 31, 2013

(54) SYSTEMS AND METHODS FOR IMPROVING AMMONIA SYNTHESIS EFFICIENCY

(75) Inventor: Israr Ul Haque, Seabrook, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 844 days.

(21) Appl. No.: 12/327,249

(22) Filed: Dec. 3, 2008

(65) Prior Publication Data
US 2010/0132259 A1 Jun. 3, 2010

(51) Int. Cl.
*C01B 3/36* (2006.01)

(52) U.S. Cl.
USPC .......................................... 48/197 R

(58) Field of Classification Search
USPC ............... 48/61–118.5, 127.1, 127.9, 48/197 R–197 A; 422/129–242; 429/400–535
See application file for complete search history.

(56) References Cited

U.S. PATENT DOCUMENTS

| | | |
|---|---|---|
| 3,264,066 A | 8/1966 | Quartulli et al. |
| 3,441,393 A | 4/1969 | Finneran at al |
| 3,442,613 A | 5/1969 | Grotz, Jr. |
| 3,572,046 A | 3/1971 | Grotz, Jr. |
| 4,549,890 A | 10/1985 | Bligh |
| 4,725,380 A | 2/1988 | Pinto |
| 5,006,131 A | 4/1991 | Karafian et al. |
| 5,011,625 A | 4/1991 | Le Blanc |
| 5,122,299 A | 6/1992 | LeBlanc |
| 5,181,937 A | 1/1993 | Karafian et al. |
| 6,077,459 A | 6/2000 | Laursen et al. |
| 7,090,816 B2 | 8/2006 | Malhotra et al. |
| 2007/0010590 A1 | 1/2007 | Abbott et al. |
| 2007/0217989 A1* | 9/2007 | Malhotra et al. ........... 423/437.1 |

* cited by examiner

*Primary Examiner* — Imran Akram
(74) *Attorney, Agent, or Firm* — Gary M. Machetta

(57) ABSTRACT

Systems and methods for producing syngas are provided. In at least one specific embodiment, a hydrocarbon can be reformed in the presence of steam and one or more first catalysts in a first reaction zone to provide an effluent containing a portion of the hydrocarbon, carbon monoxide, carbon dioxide, and hydrogen at a first temperature. The first reaction zone can include one or more catalyst-containing tubes. The effluent can be indirectly heated from the first temperature to a second temperature. The effluent at the second temperature can be reformed in the presence of one or more oxidants and one or more second catalysts at conditions sufficient to provide a syngas comprising hydrogen, carbon monoxide, carbon dioxide, and less than about 5% mol, dry basis, methane. The syngas can be used to indirectly heat the effluent from the first temperature to the second temperature.

23 Claims, 2 Drawing Sheets

SYSTEMS AND METHODS FOR IMPROVING AMMONIA SYNTHESIS EFFICIENCY

BACKGROUND

1. Field

The present embodiments generally relate to systems and methods for producing ammonia. More particularly, embodiments of the present invention relate to systems and methods for recovering heat from a synthesis gas and producing ammonia.

2. Description of the Related Art

Synthesis gas or "syngas" is typically the product of reforming a carbon containing material in the presence of steam and/or an oxidant at high temperatures. Depending on the starting materials, syngas is usually rich in carbon monoxide and hydrogen, and can also contain varying amounts of methane, carbon dioxide, nitrogen, and argon.

Conventional syngas preparation can include introducing a hydrocarbon to a fired steam reformer and contacting the hydrocarbon with a steam reforming catalyst. The primary reformed hydrocarbon is then introduced to a secondary reformer where hydrogen and unreformed hydrocarbons are partially oxidized with an oxidant in the presence of a catalyst. The reforming steps are endothermic and require heat to be supplied to the reformers in order for the reactions to proceed. The heat for the reforming reactions is usually provided by burning large amounts of fuel. Increasing the temperature of the secondary reformer can provide a higher conversion of the hydrocarbon to syngas, but doing so requires oxidizing more fuel.

A need exists, therefore, for systems and methods for converting more of the hydrocarbon to syngas while reducing equipment cost and size, and reducing the amount of fuel required to provide the heat for the reforming reactions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for producing syngas are provided. In at least one specific embodiment, a hydrocarbon can be reformed in the presence of steam and one or more first catalysts in a first reaction zone to provide an effluent containing a portion of the hydrocarbon, carbon monoxide, carbon dioxide, and hydrogen at a first temperature. The first reaction zone can include one or more catalyst-containing tubes. The effluent can be indirectly heated from the first temperature to a second temperature. The effluent at the second temperature can be reformed in the presence of one or more oxidants and one or more second catalysts at conditions sufficient to provide a syngas comprising hydrogen, carbon monoxide, carbon dioxide, and less than about 5% mol dry basis methane. The syngas can be used to indirectly heat the effluent from the first temperature to the second temperature.

Figure 1:
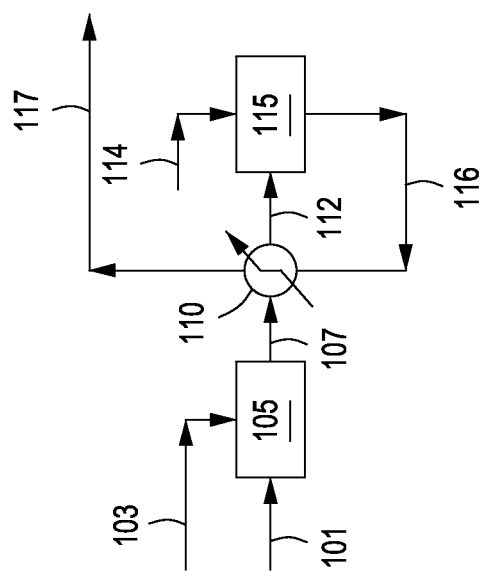
FIG. 1 depicts an illustrative system for producing a syngas according to one or more embodiments described.

With reference to the figures, FIG. 1 depicts an illustrative system 100 for producing a syngas according to one or more embodiments. In one or more embodiments, the system 100 can include one or more reformers ("primary reformers") 105, one or more heat exchangers 110, and one or more reformers ("secondary reformers") 115. A hydrocarbon feed via line 101 and steam via line 103 can be introduced to the one or more primary reformers 105 to provide a first reformed hydrocarbon ("effluent") via line 107.

In one or more embodiments, the hydrocarbon in line 101 can include one or more liquid or gaseous hydrocarbons, mixtures thereof, or any combination thereof. In one or more embodiments, the hydrocarbon in line 101 can include methane, ethane, propane, butane, or any combination thereof. For example, the methane concentration in the hydrocarbon in line 101 can range from a low of about 30% vol, about 50% vol, or about 75% vol to a high of about 95% vol, about 99% vol, or about 99.9% vol with the balance including $C_2$, $C_3$, and heavier hydrocarbons. In one or more embodiments, the pressure of the hydrocarbon in line 101 can range from a low of about 700 kPa, about 1,000 kPa, or about 1,400 kPa to a high of about 4,000 kPa, about 4,750 kPa, or about 5,500 kPa. Although not shown, the hydrocarbon in line 101 can be preheated prior to introduction to the one or more primary reformers 105. In one or more embodiments, the hydrocarbon in line 101 can be preheated to a temperature ranging from about 400° C. to about 600° C.

In one or more embodiments, the steam introduced via line 103 can be introduced to the hydrocarbon in line 101 or to the one or more primary reformers 105. In one or more embodiments, the molar ratio of steam-to-carbon within lines 103 and 101, respectively, can range from about 2.5 to about 4, from about 2.5 to about 3.5, or from about 3 to about 4. In one or more embodiments, the pressure of the steam in line 103 can range from a low of about 700 kPa, about 1,000 kPa, or about 1,400 kPa to a high of about 4,000 kPa, about 4,750 kPa, or about 5,500 kPa.

The effluent in line 107 has a temperature ("first temperature") greater than the hydrocarbon in line 101. The effluent in line 107 can include, but is not limited to, hydrogen ("$H_2$"), carbon dioxide ("$CO_2$"), carbon monoxide ("CO"), nitrogen, argon, water, and methane. In one or more embodiments, the $H_2$ concentration in the effluent in line 107 can range from a low of about 31% mol, about 33% mol, or about 35% mol to a high of about 39% mol, about 41% mol, or about 43% mol. In one or more embodiments, the CO concentration in the effluent in line 107 can range from a low of about 3% mol, about 3.5% mol, or about 4% mol to a high of about 5% mol, about 5.5% mol, or about 6% mol. In one or more embodiments, the $CO_2$ concentration in the effluent in line 107 can range from a low of about 4% mol, about 4.5% mol, or about 5% mol to a high of about 6% mol, about 6.5% mol, or about 7% mol. In one or more embodiments, the $H_2O$ concentration in the effluent in line 107 can range from a low of about 38% mol, about 40% mol or about 42% mol to a high of about 47% mol, about 49% mol, or about 51% mol. In one or more embodiments, the methane concentration in the effluent in line 107 can range from a low of about 6% mol, about 7% mol, or about 8% mol to a high of about 10% mol, about 11% mol, or about 12% mol. For example, in at least one specific embodiment the effluent in line 107 can contain about 35% mol to about 39% mol $H_2$, about 4% mol to about 5% mol CO, about 6% mol to about 8% mol $CO_2$, about 8% mol to about 10% mol methane, and from about 42% mol to about 47% mol $H_2O$.

In one or more embodiments, the first temperature can range from a low of about 650° C., about 675° C., or about 700° C. to a high of about 730° C., about 740° C., or about 750° C. In one or more embodiments, the first temperature can be about 715° C., about 725° C., or about 735° C. In one or more embodiments, the first temperature can be at least 700° C., at least 710° C., at least 715° C., or at least 720° C.

In one or more embodiments, the effluent at the first temperature within the one or more primary reformers 105 can be withdrawn directly from the one or more primary reformers 105 and sent to the one or more heat exchangers 110 without cooling. In one or more embodiments, the effluent at the first temperature within the one or more primary reformers 105 can be withdrawn directly from the one or more primary reformers and sent to the one or more heat exchangers 110 without cooling the effluent at the first temperature within the one or more primary reformers 105. The only heat loss of the effluent in line 107 between the one or more primary reformers 105 and the one or more heat exchangers 110 can be the heat loss to the environment during transport. In other words no work is done on the effluent.

In one or more embodiments, the temperature of the hydrocarbon introduced via line 101 can be reformed to provide an effluent via line 107 having a monotonically increased temperature. As used herein, the term, "monotonically" means a change in temperature, which either consistently increases or consistently decreases, but does not oscillate in relative value. For example, the hydrocarbon via line 101 introduced to the primary reformer 105 at a temperature of 500° C. can be monotonically increased to a temperature of about 650° C. or more, which can be recovered from the one or more primary reformers via line 107.

In one or more embodiments, the effluent in line 107 at the first temperature can be heated using the one or more heat exchangers 110. A raw syngas introduced via line 116 can be used to indirectly heat the effluent within the one or more heat exchangers 110. In one or more embodiments, the raw syngas in line 116 can be provided by the one or more secondary reformers 115. The effluent in line 112 has a temperature ("second temperature") greater than the effluent in line 107. The raw syngas ("cooled raw syngas") in line 117 has a temperature less than the raw syngas in line 116.

In one or more embodiments, the second temperature can range from a low of about 850° C., about 860° C., or about 870° C. to a high of about 910° C., about 920° C., or about 930° C. In one or more embodiments, the second temperature can be about 875° C., about 885° C., or about 895° C.

In one or more embodiments, the raw syngas in line 116 can have a temperature ranging from a low of about 960° C., about 970° C., or about 980° C. to a high of about 1,010° C., about 1,020° C., or about 1,030° C. In one or more embodiments, the temperature of the raw syngas in line 116 can be about 995° C., about 1,000° C., or about 1,005° C. In one or more embodiments, the cooled raw syngas in line 117 can be at a temperature ranging from a low of about 860° C., about 870° C., or about 880° C. to a high of about 900° C., about 910° C., or about 920° C. more embodiments, the temperature of the cooled raw syngas in line 117 can be about 880° C., about 890° C., or about 900° C.

In one or more embodiments, the temperature of the effluent in line 107 can be increased via indirect heat exchange in the one or more heat exchangers 110 by about 150° C. or more, about 165° C. or more, about 185° C. or more, about 200° C. or more, or about 215° C. or more. In one or more embodiments, the temperature of the raw syngas in line 116 can be decreased via the indirect heat exchange in the one or more heat exchangers 110 by about 80° C. or more, about 100° C. or more, about 120° C. or more, about 130° C. or more, or about 140° C. or more.

The heated effluent in line 112 can be introduced to the one or more secondary reformers 115 to provide the raw syngas via line 116. In one or more embodiments, an oxidant via line 114 can be introduced to the secondary reformer 115. In one or more embodiments, the oxidant can be compressed using one or more compressors to provide a compressed oxidant via line 114. In one or more embodiments, the oxidant can be air, containing about 21% mol oxygen, about 78% mol nitrogen, and about 1% mol argon. In one or more embodiments, the oxidant can be oxygen enriched air, nitrogen enriched air, or nitrogen lean air, e.g. less than 5% mol nitrogen. The pressure of the compressed oxidant in line 114 can range from a low of about 700 kPa, about 1,000 kPa, or about 1,400 kPa to a high of about 4,000 kPa, about 4,750 kPa, or about 5,500 kPa. Although not shown, the oxidant can be preheated to a temperature of about 500° C. or more, about 550° C. or more, about 600° C. or more, about 700° C. or more, or about 800° C. or more.

In one or more embodiments, the raw syngas in line 116 can contain, but is not limited to $H_2$, $CO_2$, CO, nitrogen, argon, water, and methane. The raw syngas in line 116 can contain less than about 5% mol, dry basis, methane, less than about 3% mol, dry basis, methane, less than about 1% mol, dry basis, methane, less than about 0.7% mol, dry basis, methane, less than about 0.5% mol, dry basis methane, less than about 0.4% mol, dry basis methane, or less than about 0.3% mol, dry basis, methane.

In one or more embodiments, increasing the temperature of the effluent in line 107 from the primary reformer 105 can improve the steam reforming reactions within the secondary reformer 115. More of the hydrocarbons present in the effluent, for example methane and/or other hydrocarbons can be converted to $H_2$ and CO as the temperature of the effluent increases. A higher conversion of the hydrocarbons present in the effluent to $H_2$ and CO can reduce the amount of hydrocarbons required via line 101, the amount of steam required via line 103, the amount of fuel required to heat the primary reformer 115 and other process streams. For example, the hydrocarbon via line 101 and the steam via line 103 can be reduced by about 7%, about 10%, or about 13%, however, the same amount of $H_2$ and CO can be provided in the raw syngas via line 116 due to the increase in the hydrocarbon conversion rate. An additional benefit of transferring heat from the raw syngas in line 116 to the effluent in line 107 can be a reduction in equipment sizes, which also reduces capital costs.

In one or more embodiments, the fuel required to heat the one or more primary reformers 105 can be reduced by about 5% or more, about 7% or more, about 9% or more, or about 11% or more. Another benefit of increasing the temperature of the effluent in line 107 before introduction to the one or more secondary reformers 115 can be a reduction in the amount of hydrocarbons present in the raw syngas in line 116 provided by the secondary reformer 115. Further conversion of the hydrocarbons to $H_2$ and CO in the secondary reformer 115 can reduce downstream reject gas and/or recycle gas (not shown). For example, a downstream reject gas flow can be reduced by about 8%, about 10%, or about 13%, thereby improving the process efficiency. In one or more embodiments, an energy consumption can be reduced by about 0.1 Gcal/Mt of ammonia or more, about 0.12 Gcal/Mt of ammonia or more, or about 0.14 Gcal/Mt of ammonia or more.

The one or more primary reformers 105, the one or more secondary reformers 115, or both can include one or more catalysts. The one or more catalysts can include, but are not limited to noble metals, cobalt, nickel, oxides thereof, derivatives therefore, or combinations thereof. The one or more catalysts can be supported by one or more support materials. The one or more support materials can include, but are not limited to alumina, refractory alumina, magnesium aluminate, calcium aluminate, calcium aluminate titanate, zirconia, cerium modified zirconia, or any combination thereof. An illustrative catalyst including nickel can have a nickel content ranging from a low of about 5% wt, about 10% wt, or about 12% wt to a high of about 15% wt, about 20% wt, or about 25% wt. The one or more catalysts disposed within the one or more primary reformers 105 can be the same as the one or more catalysts disposed within the one or more secondary reformers 110. The one or more catalysts disposed within the one or more primary reformers 105 can be different from the one or more catalysts disposed within the one or more secondary reformers 110. For example, a nickel containing catalyst disposed within the one or more primary reformers 105 can contain from about 15% wt nickel to about 20% wt nickel and a nickel containing catalyst disposed within the one or more secondary reformers 110 can contain from about 10% to about 15% nickel.

The catalysts can be prepared in any desired shape or form by a variety of methods, for example, briquetting, tabletting, etc. The shape of the catalyst can be in the form of extruded, briquetted or tabletted cylinders, polylobal extrusions, spheres, rings, hollow core cylinders, solid cylinders, hollow core cylinders with grooves on the inside and/or outside surfaces, or any other appropriate geometric shape.

The one or more primary reformers 105 can be any suitable type of reformer. For example, the one or more primary reformers 105 can be a plurality of radiantly heated, single walled, catalyst-containing tubes. The one or more primary reformers 105 can include 200 or more tubes, 400 or more tubes, 500 or more tubes, 600 or more tubes, 700 or more tubes, 800 or more tubes, 900 or more tubes, or 1,000 or more tubes. In one or more embodiments, the tubes can have an inside diameter ranging from a low of about 40 mm, about 50 mm, or about 65 mm to a high of about 90 mm, about 100 mm, or about 115 mm or more. For example, the inner diameter of one or more tubes can be about 70 mm, about 75 mm, or about 80 mm. In one or more embodiments, the diameter of the one or more catalyst tubes can reduce or minimize the radial temperature gradient of the tubes.

In one or more embodiments, the hydrocarbon introduced via line 101 to the one or more primary reformers 105 can flow through the plurality of tubes and can be recovered via a manifold collection system (not shown), which can be in fluid communication with line 107. For example, the plurality of tubes can be mounted horizontally, vertically, or at any angle therebetween and the hydrocarbon introduced via line 101 can flow from a first end of the tubes in fluid communication with line 101 to a second end of the plurality of tubes, which can be in fluid communication with line 107.

In one or more embodiments, the one or more secondary reformers 115 can be any suitable type of reformer. For example, the one or more secondary reformers 115 can be an internally insulated reformer, which can also be cooled on the outside via one or more cooling systems, e.g. a water jacket. The one or more secondary reformers 115 can include one or more catalyst in any arrangement, configuration and/or orientation. The one or more catalyst beds can include fixed beds, fluidized beds, ebullating beds, slurry beds, moving beds, bubbling beds, any other suitable type of catalyst bed, or combinations thereof. In one or more embodiments, the one or more secondary reformers 115 can include, for example, a fixed single bed nickel catalyst set in two layers.

Figure 2:
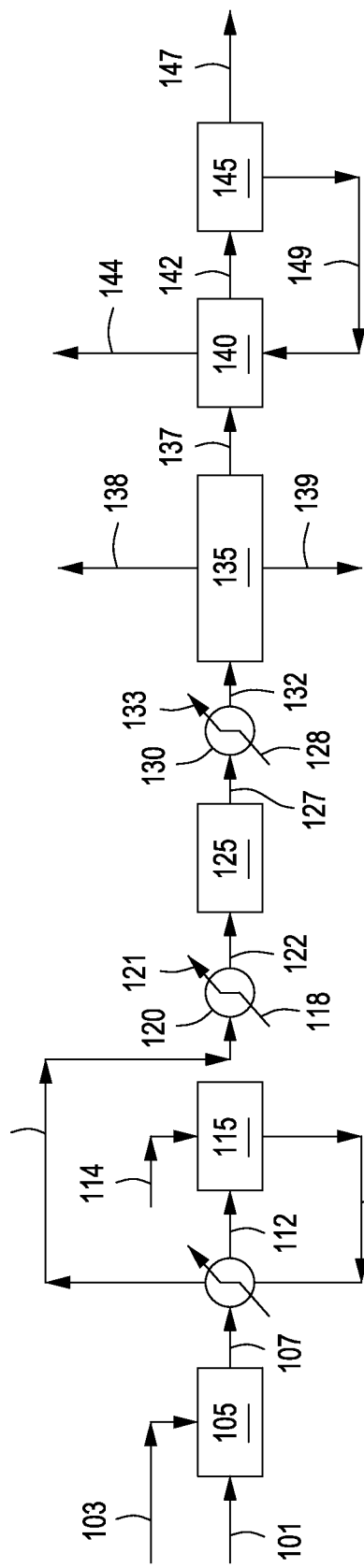
FIG. 2 depicts an illustrative system for producing ammonia according to one or more embodiments described.

FIG. 2 depicts an illustrative system 200 for producing ammonia according to one or more embodiments. In one or more embodiments, the system 200 can include one or more primary reformers 105, secondary reformers 115, shift converter system 125, syngas purification systems (two are shown 135, 140), ammonia synthesis systems 145, and one or more heat exchangers (three are shown 110, 120, 130). In one or more embodiments, the primary reformer 105 and the secondary reformer 115, and heat exchanger 110 can be as discussed and described above in reference to FIG. 1.

In one or more embodiments, a raw syngas via line 117 can be recovered from the secondary reformer 115 as discussed and described above in reference to FIG. 1. The raw syngas via line 117 can be introduced to one or more heat exchangers 120 to provide a further cooled raw syngas via line 122. Heat can be indirectly transferred in the one or more heat exchangers 120 from the raw syngas introduced via line 117 to a heat transfer medium introduced via line 118. Suitable heat transfer mediums introduced via line 118 can include, but are not limited to water, waste water, another process feed from within the plant, mixtures thereof, or combinations thereof. For example, the heat transfer medium in line 118 can be boiler feed water. In one or more embodiments, steam via line 121 and a cooled raw syngas product via line 122 can be recovered.

The steam provided from the indirect heat exchange via line 121 can be low pressure steam, medium pressure steam, or high pressure steam. In one or more embodiments, the steam in line 121 can have a temperature of about 200° C. or more, 300° C. or more, 400° C. or more, 450° C. or more, 475° C. or more, or 500° C. or more. In one or more embodiments, the pressure of the steam in line 121 can range from a low of about 200 kPa, about 400 kPa, or about 600 kPa to a high of about 4,200 kPa, about 6,200 kPa, about 8,500 kPa, or about 12,500 kPa or more.

The one or more heat exchangers 120 can be or include any system, device, or combination of systems and/or devices suitable for indirectly transferring heat from one fluid to another fluid. For example, the heat exchanger 120 can be or include one or more shell-and-tube, plate and frame, spiral wound, U-tube, and/or bayonet style heat exchangers. In one or more embodiments, the one or more heat exchangers 120 can include surface enhanced tubes (e.g. fins, static mixers, rifling, heat conductive packing, turbulence causing projections, or any combination thereof), and the like.

In one or more embodiments, the cooled raw syngas via line 122 can be introduced to the one or more shift converter systems 125 to provide a shift converted syngas via line 127.

The one or more shift converter systems 125 can adjust the hydrogen to carbon monoxide ratio ("$H_2$:CO") of the syngas by converting carbon monoxide to carbon dioxide. Within the one or more shift converters, a water-gas shift reaction can react at least a portion of the carbon monoxide in the cooled raw syngas introduced via line 122 with water in the presence of a catalyst and/or high temperature to produce hydrogen and carbon dioxide. The one or more shift reactors can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. For example, a sorption enhanced water-gas shift ("SEWGS") process, utilizing a pressure swing adsorption unit having multiple fixed bed reactors packed with shift catalyst and high temperature (around 475° C.) carbon dioxide adsorbent, can be used.

In one or more embodiments, the one or more shift converter systems 125 can include two or more reactors arranged in series and/or parallel. The one or more shift converter systems 125 can include one or more high temperature shift converters ("HTSC"), one or more medium temperature shift converters ("MTSC"), one or more low temperature shift converters ("LTSC"), or any combination thereof. In one or more embodiments, at least a portion of the syngas via line 122 can be introduced to one or more HTSCs, MTSCs, and/or LTSCs in any order and/or combination thereof.

The shift converted syngas provided via line 127 can contain less carbon monoxide than the cooled raw syngas introduced via line 122. The converted syngas via line 127 can contain about 5% mol or less dry basis carbon monoxide, about 3% mol or less dry basis carbon monoxide, about 2% mol dry basis or less carbon monoxide, about 1% mol or less dry basis carbon monoxide, or about 0.5% mol dry basis or less dry basis carbon monoxide.

The syngas via line 122 can be apportioned equally or unequally to any one or more of the HTSCs, MTSCs, LTSCs. For example, about 75% vol of the cooled raw syngas via line 122 can be introduced to a HTSCs and about 25% can be introduced to a MTSC. The converted syngas from the HTSC and the MTSC can then be introduced to the one or more heat exchangers 130 and/or purification system 135.

In one or more embodiments, the one or more HTSCs, MTSCs, and/or LTSCs can contain one or more catalysts. The one or more HTSCs, MTSCs, and LTSCs can convert carbon monoxide in the cooled raw syngas in line 122 to carbon dioxide by reacting the carbon monoxide in the presence of one or more catalysts within in the one or more HTSCs, MTSCs, and/or LTSCs, at a temperature sufficient to oxidize the carbon monoxide. The catalyst within the one or more HTSCs can include, but is not limited to iron oxide, zinc ferrite, magnetite, chromium oxides, derivatives thereof, or any combination thereof. The one or more HTSCs can be operated at a temperature of from about 325° C. to about 550° C. The catalyst disposed in the one or more MTSCs can include, but is not limited to, iron oxide, chromium oxide, derivatives thereof, or any combination thereof. The one or more MTSCs can be operated at a temperature of from about 250° C. to about 300° C. The catalyst disposed in the one or more LTSCs can include, but is not limited to, copper, zinc, copper promoted chromia, derivatives thereof, or any combination thereof. The one or more LTSC can be operated at a temperature from about 180° C. to about 220° C.

In one or more embodiments, the syngas via line 127 can be introduced to the one or more heat exchangers 130 to provide a cooled shift converted syngas via line 132. Heat can be indirectly transferred from the shift converted syngas introduced via line 127 to a heat transfer medium introduced via line 128. In one or more embodiments, one or more suitable heat transfer mediums via line 128 can be introduced to the one or more heat exchangers 130. The heat transfer medium introduced via line 128 can be, but is not limited to water, waste water, another process feed from within the plant, mixtures thereof, or combinations thereof. In one or more embodiments, steam via line 133 can be provided, which can be low pressure steam, medium pressure steam, or high pressure steam. Although not shown, the syngas in line 127 can be directly cooled by introducing the one or more heat transfer mediums in line 118 to the syngas in line 127.

The one or more heat exchangers 120 can be or include any system, device, or combination of systems and/or devices suitable for indirectly transferring heat from one fluid to another fluid. For example, the one or more heat exchangers 120 can be or include one or more shell-and-tube, plate and frame, spiral wound, U-tube, and/or bayonet style heat exchangers. In one or more embodiments, the one or more heat exchangers 120 can include surface enhanced tubes (e.g. fins, static mixers, rifling, heat conductive packing, turbulence causing projections, or any combination thereof), and the like.

In one or more embodiments, the cooled shift converted syngas via line 132 can be introduced to the syngas purification system 135. In one or more embodiments, the syngas purification system 135 can include, but is not limited to one or more carbon dioxide removal systems, methanators, driers, or any combination thereof. In one or more embodiments, the cooled shift converted syngas can be introduced via line 132 to one or more carbon dioxide removal systems to remove at least a portion of the carbon dioxide.

The one or more carbon dioxide removal systems within the syngas purification system 135 can selectively separate carbon dioxide from the converted syngas to provide a carbon dioxide lean syngas and carbon dioxide. The separated carbon dioxide can be recovered via line 138. In one or more embodiments, the carbon dioxide lean syngas can optionally be introduced to the one or more methanators and/or the one or more driers within the purification system 135.

The carbon dioxide lean syngas can be introduced to the one or more methanators within the purification system 135 to convert at least a portion of any carbon monoxide and/or carbon dioxide to methane and water. For example, the total carbon monoxide and carbon dioxide in the syngas can be less than about 1000 ppmw, less than about 750 ppmw, or less than about 500 ppmw of total carbon monoxide and carbon dioxide. In one or more embodiments, the syngas lean in carbon monoxide and carbon dioxide can be introduced to the one or more driers within the purification system 135 to provide water via line 139 and a dried syngas. The one or more driers can remove or separate at least a portion of any water in the carbon monoxide and carbon dioxide lean syngas to provide the dried syngas.

The purification system 135 can provide a syngas via line 137 which can have a hydrogen concentration ranging from a low of about 40% mol, about 50% mol, or about 55% mol to a high of about 75% mol, about 80% mol, or about 85% mol. The syngas in line 137 can have a nitrogen concentration ranging from a low of about 10% mol, about 20% mol, or about 25% mol to a high of about 40% mol, about 45% mol, or about 50% mol. The syngas in line 137 can have a methane concentration of less than about 4% mol, less than about 3% mol, less than about 2% mol, less than about 1% mol, or less than about 0.9% mol. The syngas in line 137 can have an oxygen concentration from about 0.1% mol to about 5% mol, about 0.5% mol to about 4% mol, or about 0.8% mol to about 3% mol. The syngas in line 137 can have an argon concentration ranging from about 0.05% mol to about 2% mol, about 0.1% mol to about 1.5% mol, or about 0.1% mol to about 1% mol. The hydrogen to nitrogen ($H_2:N_2$) molar ratio can range from about 1.5:1 to about 5:1, from about 2:1 to about 4:1, or from about 2.2:1 to about 3.2:1. The $H_2:N_2$ molar ratio can be about 1.6:1, about 1.8:1, about 1.9:1, about 2.1:1, about 2.2:1, about 2.3:1, or about 2.4:1.

The pressure of the syngas in line 137 can range from about 1,000 kPa to about 20,800 kPa, about 2,000 kPa to about 13,700 kPa, or about 3,000 kPa to about 10,400 kPa. The temperature of the syngas in line 137 can range from about −100° C. to about 100° C., about −50° C. to about 50° C., or about −25° C. to about 25° C.

The one or more carbon dioxide removal systems can include any one or a combination of physical, mechanical, electrical and/or chemical systems configured in series, parallel, or any combination thereof. In one or more embodiments, the one or more carbon dioxide removal systems can include one or more physical separation systems including, but not limited to, membrane type systems and solvent based systems. For example, the one or more carbon dioxide removal systems can include, but are not limited to, absorption/desorption type, solvent-based systems. The carbon dioxide removal system can contact the syngas introduced via line 132 with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The one or more methanators can include any one or a combination of physical, mechanical, electrical and/or chemical systems to convert carbon monoxide and carbon dioxide to methane, configured either in series, parallel, or any combination thereof. In one or more embodiments, the one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of from about 200° C. to about 400° C. The carbon monoxide and carbon dioxide lean syngas can contain about 50 ppm carbon monoxide and carbon dioxide or less, or about 30 ppm carbon monoxide and carbon dioxide or less, or about 10 ppm carbon monoxide and carbon dioxide or less.

The one or more driers can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

In one or more embodiments, the syngas in line 137 can be introduced to the one or more purification systems 140, where one or more contaminants such as excess nitrogen, argon, oxygen, and methane can be removed to provide a contaminant-lean gas mixture or purified syngas via line 142. The one or more purification systems 140 can be used to remove or separate any contaminants, including excess nitrogen, i.e. nitrogen in excess of that necessary to provide a $H_2:N_2$ molar ratio of from about 2.2:1 to about 3.2:1, from the compressed gas mixture in line 205. In one or more embodiments, the one or more purification systems 140 can include one or more cryogenic-type separators operating at a temperature less than −150° C. The one or more contaminants and/or excess nitrogen can be removed from the one or more purification systems 140 as a waste gas via line 144.

In one or more embodiments, the $H_2:N_2$ molar ratio of the purified syngas in line 142 can range from about 2:1 to about 4:1, or from about 2.2:1 to about 3.2:1. For example, the $H_2:N_2$ molar ratio can be about 2.9:1, about 3:1, about 3.1:1, or about 3.2:1. The hydrogen concentration in the purified syngas can range from about 50% mol to about 90% mol, about 60% mol to about 85% mol, or about 70% mol to about 80% mol. The nitrogen concentration in the purified syngas in line 142 can range from about 10% mol to about 40% mol, about 15% mol to about 35% mol, or about 20% mol to about 30% mol. The methane concentration in the purified syngas in line 142 can range from about 0.001% mol to about 0.05% mol, about 0.002% mol to about 0.03% mol, or about 0.005% mol to about 0.01% mol. The oxygen concentration in the purified syngas in line 142 can range from about 0.001% mol to about 0.05% mol, about 0.002% mol to about 0.03% mol, or about 0.005% mol to about 0.01% mol. The argon concentration in the purified syngas in line 142 can range from about 0.05% mol to about 2% mol, about 0.1% mol to about 1.5% mol, or about 0.1% mol to about 1% mol.

In one or more embodiments, the purified syngas via line 142 can be introduced to the one or more ammonia synthesis systems 145. The one or more ammonia synthesis systems 145 can include one or more ammonia converters and one or more ammonia condensers. At least a portion of the nitrogen and hydrogen present in the purified syngas can combine to provide an ammonia converter product (not shown). The ammonia concentration of the ammonia converter product can range from a low of about 5% mol, about 10% mol, or about 15% mol to a high of about 25% mol, about 30% mol, or about 35% mol. For example, the ammonia concentration of the ammonia converter product can range from about 12% mol to about 25% mol, or from about 16% mol to about 22% mol. The hydrogen concentration of the ammonia converter product can range from a low of about 30% mol, about 40% mol, or about 50% mol to a high of about 70% mol, about 75% mol, or abut 80% mol. The nitrogen concentration of the ammonia converter product can range from a low of about 5% mol, about 10% mol, or about 15% mol to a high of about 30% mol, about 35% mol, or about 40% mol.

In one or more embodiments, the one or more ammonia converters can be conventional single or multi-pass converters using one or more magnetite catalysts. In one or more embodiments, the one or more ammonia converters can be single or multi-pass converters using one or more noble metal catalysts, or one or more catalysts based upon ruthenium, such as the ruthenium-based KAAP catalyst available from Kellogg, Brown, and Root LLC. One or more higher activity, noble metal, catalysts can allow the use of lower pressures within the ammonia synthesis loop, thereby permitting use of a single barrel ammonia compressor (not shown).

In one or more embodiments, the one or more ammonia converters can include any reactor intended to operate at elevated pressures and/or temperatures to convert at least a portion of a feed gas containing nitrogen and hydrogen, e.g. the purified syngas, to ammonia. In one or more embodiments, the one or more ammonia converters can include one or more "Split-Flow Ammonia Converters" as described in U.S. Pat. No. 7,081,230. In one or more embodiments, the one or more ammonia converters can include one or more "Isothermal Ammonia Converters" as described in U.S. Pat. No. 6,171,570. In one or more embodiments, the one or more ammonia converters can include one or more "Horizontal Ammonia Converter Adapted for High Activity Catalyst" as described in U.S. Pat. No. 6,132,687. In one or more embodiments, the one or more ammonia converts can include one or more ammonia converters as described in U.S. Provisional Patent Application No. 60/990,207 filed on Nov. 26, 2007.

The ammonia converter product can be introduced to the one or more ammonia condensers. The one or more ammonia condensers can condense and separate the ammonia to provide an ammonia product (the "finished product") via line 147 and unreacted hydrogen and/or nitrogen gas ("recycle syngas") or ("reject gas") via line 149. The finished product via line 147 can contain, but is not limited to ammonia, hydrogen, and nitrogen. The finished product can contain a minimum of about 85% wt, a minimum of about 90% wt, a minimum of about 95% wt, or a minimum of 99.9% wt ammonia. The finished product via line 147 can contain a maximum of about 15% wt, about 10% wt, about 5% wt or about 0.1% wt of combined hydrogen and nitrogen.

The recycle syngas via line 149 can be recycled to the one or more purification units 140 and/or to the one or more methanators and/or driers which can be included in the one or more purification systems 135, as discussed and described above. The hydrogen concentration in the recycle syngas in line 149 can range from about 40% mol to about 90% mol, about 50% mol to about 85% mol, or about 60% mol to about 80% mol. The nitrogen concentration in the recycle syngas in line 149 can range from about 10% mol to about 60% mol, about 15% mol to about 50% mol, or about 20% mol to about 40% mol.

The one or more ammonia condensers can include any mechanical or chemical system capable of selectively separating ammonia from a gas mixture including at least hydrogen and nitrogen. The one or more ammonia condensers can include one or more cryogenic purifiers containing one or more refrigeration exchangers and one or more refrigeration compressors.

Figure 3:
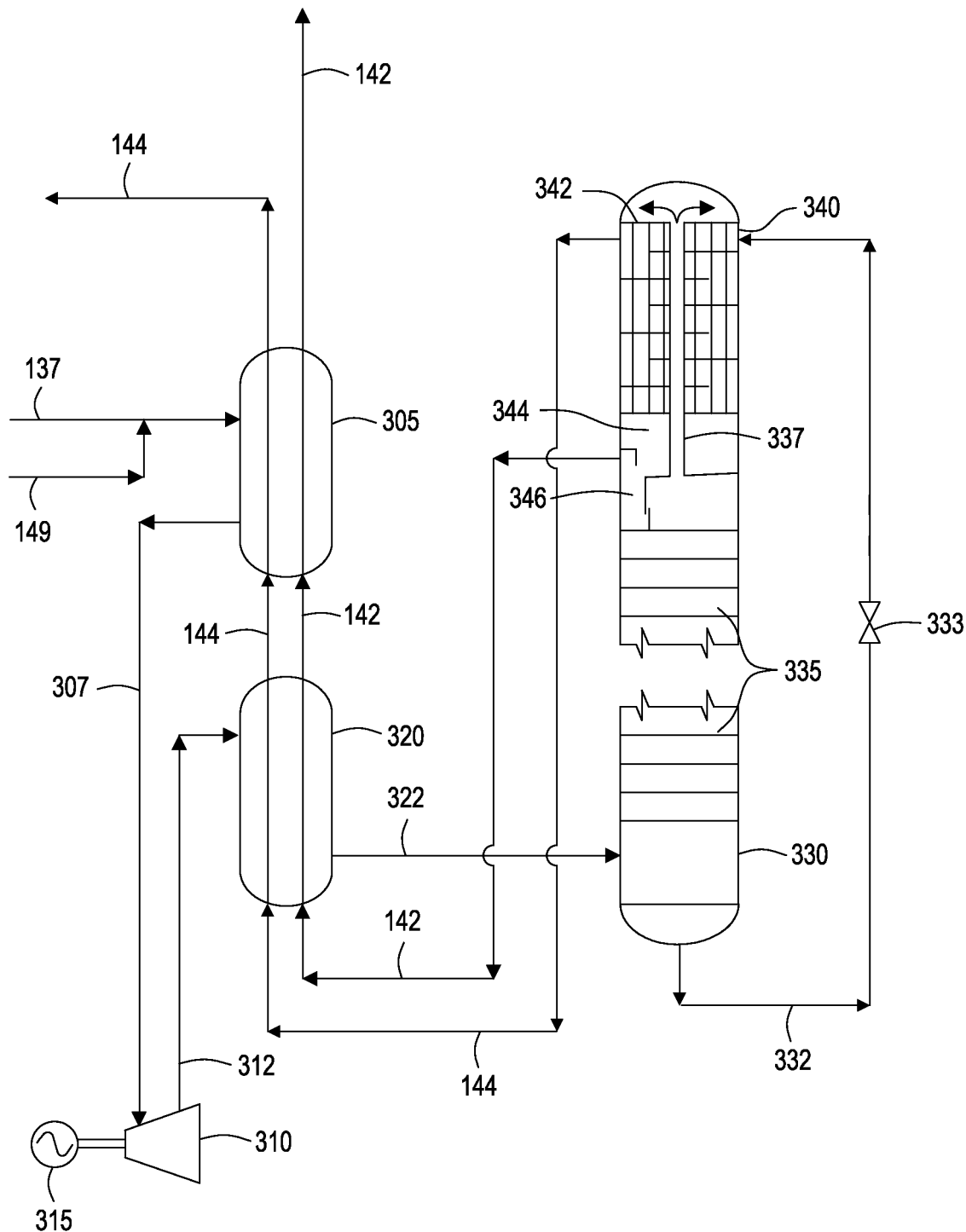
FIG. 3 depicts an illustrative purification system for purifying a syngas for ammonia synthesis, according to one or more embodiments described.

FIG. 3 depicts an illustrative syngas purification system 300 for purifying a syngas for ammonia synthesis according to one or more embodiments. In one or more embodiments, the syngas purification system 300 can include, but is not limited to, one or more cross-exchangers (two are shown 305, 320), one or more expanders 310, one or more generators 315, one or more vapor-liquid contacting columns 330, and one or more condensers ("heat exchangers") 340. The syngas purification system 300 can accommodate a large disparity in the composition of the syngas introduced via line 137. The composition disparities can include, but are not limited to variations in the content of the hydrocarbon, nitrogen, carbon monoxide, and carbon dioxide of the syngas.

In one or more embodiments, a syngas containing hydrogen and nitrogen can be introduced via line 137 to cross-exchanger 305. In one or more embodiments, at least a portion of the recycle syngas in line 149 can be introduced to the syngas in line 137. The syngas in line 137 and the recycle syngas in line 149 can be as discussed and described above in reference to FIGS. 1 and 2. The syngas and the optional recycle syngas introduced via line 137 can be indirectly cooled by a cold purified syngas in line 142 and a cold waste gas in line 144 in cross-exchangers 305, 320. The syngas via line 307 can be expanded in the expander 319, between the two cross-exchangers 305, 320, to further cool the syngas and to recover energy via a directly coupled generator 315. The expander can be bypassed or supplemented using a joule-Thompson ("J-T") valve (not shown). In one or more embodiments, the expander 319 can be a work-output device that receives a liquid supply and produces a liquid or vapor effluent or a vapor-liquid effluent. Where the effluent fluid is a liquid, the expander 319 can be a hydraulic turbine.

The cooled and partially liquefied syngas via line 322 from the cross-exchanger 320 can be introduced to the vapor-liquid contacting column 330 where it can be further cooled, partly condensed, and rectified to provide the purified syngas via line 142. The purified syngas in line 142 and the waste gas in line 144 can be as discussed and described above in reference to FIG. 2.

In one or more embodiments, a waste gas stream can be discharged from the vapor-liquid contacting column via line 332, flashed across a level control valve 333 and used as a coolant in the heat exchanger 340, which can be optionally integrated with the vapor-liquid contacting column 332. The heat exchanger 340 can cool and partially condense overhead vapors from the vapor-liquid contacting column 332 to provide a syngas liquid which can reflux the column 330. The purified syngas via line 142 can be compressed for conversion in ammonia converters (not shown) that can operate at higher pressures. The pressure drop incurred by the syngas introduced via line 137 and the optional recycle syngas introduced via line 149 requires recompression downstream of the purification system 300. In one or more embodiments, the recompression of the syngas can be eliminated as discussed and described in U.S. Pat. No. 7,090,816.

In one or more embodiments, the conditions in the vapor-liquid contacting column 330 can determine the composition of the purified syngas in line 142. For example, more refrigeration reduces the nitrogen content and less refrigeration increases the nitrogen content of the purified syngas. The partially liquefied syngas introduced via line 322 to the vapor-liquid contacting column can provide a vapor that can flow upward through a contact zone 335 to absorb nitrogen and enrich the hydrogen content of the vapor. The vapor-liquid contact zone 335 can be or include, but is not limited to, randomly packed material, structured packed material, one or more trays, one or more baffles, or any combination thereof. The randomly packed material can include, but is not limited to, Nutter rings, I-rings, P-rings, R-rings, Raschig rings, saddle rings, A-PAK rings, Pall rings, U-rings, or any other known type of packing ring, or combination of packing rings. The structured packed material can include, but is not limited to, corrugated sheets, crimped sheets, gauzes, grids, wire mesh, monolith honeycomb structures, or any combination thereof. The one or more trays and/or baffles can include, but are not limited to, floating valve trays, fixed valve trays, sieve trays, bubble cap trays, cartridge trays, dual flow trays, baffle trays, shower deck trays, disc and donut trays, orbit trays, horse shoe trays, snap-in valve trays, chimney trays, slit trays, plates, perforated trays, or any combination thereof.

At the upper end of the contact zone 335 the vapor can enter a vapor riser 337 and flow to a vapor inlet zone 342 at an upper end of the condenser 340. The vapor can pass through the tube-side of the condenser 340 for partial condensation by indirect heat exchange with the waste gas introduced via line 332 to the shell-side of the condenser 340 to provide a syngas further enriched in lower boiling point components, e.g. hydrogen. Vapor and condensate can exit the condenser 340 and can be separated in a knockout zone 344. The vapor can exit the vapor-liquid contacting column 330 as the purified syngas via line 142. The condensate can collect in a liquid seal well 346 below the knockout zone 344 and can be in fluid communication with the contact zone 335. The condensate can overflow from the seal well 346 to flow downward through the contact zone 335 to the bottom of the liquid-vapor contact zone 330. The waste gas can be recovered via line 144, which can be introduced to the cross-exchangers 305, 320 as discussed above.

Embodiments of the present invention can be further described with the following simulated processes. The following two simulated process results shown in Table 1 illustrate (1) a standard process and (2) the standard process modified to indirectly exchange heat from the raw syngas in line 116 to the effluent in line 107, according to one or more embodiments described above with reference to FIGS. 1 and 2.

TABLE 1

Simulated Processes Without and With Indirect Heating of Effluent in Line 107

| Parameters | No Indirect Heating | Indirect Heating | Difference |
| --- | --- | --- | --- |
| Ammonia Production (MTPD) | 4,000 | 4,000 | |
| Energy Consumption (Gcal/Mt) | 6.94 | 6.82 | −1.73% |
| Hydrocarbon via line 101 (kg/hr) | 93,180 | 84,290 | −9.50% |
| Process Steam via line 103 (kg/hr) | 271,516 | 245,574 | −9.50% |
| Oxidant via line 114 (kg/hr) | 299,067 | 297,027 | −0.70% |
| Front end Throughput, Exit Secondary Reformer 115 (kg/hr) | 669,142 | 632,202 | −5.50% |
| Temperature of Raw Syngas in line 116, ° C. | 902 | 999 | 97 |
| Methane Content of Raw Syngas in line 116 (mole % dry basis) | 2.44 | 0.48 | |
| H2 Content of Raw Syngas in line 116 (mol % dry basis) | 12,778 | 12,334 | |
| CO Content of Raw Syngas in line 116 (mole % dry basis) | 2,827 | 3,175 | |
| Feed Coil Duty (GJ/hr) | 73.6 | 66.8 | −9.20% |
| Mixed Feed Coil Duty (GJ/hr) | 135.8 | 122.9 | −9.50% |
| Primary Reformer 105 Duty (GJ/hr) | 597.5 | 542 | −9.30% |
| Effluent Temperature in line 107 (° C.) | 718 | 718 | |
| Primary Reformer 105 Net Fuel (GJ/hr) | 1,497 | 1,395 | −6.80% |
| HP Steam Production (Mt/hr) | 782,600 | 748,400 | −4.40% |
| MP Steam Export, Net (Mt/hr) | 147,600 | 139,700 | −5.30% |
| Methane Content of Syngas in Line 137 (mol %) | 2.9 | 0.84 | |
| Methane Content of Syngas in line 142 (ppm) | 405 | 5 | |
| Reject Gas in Line 149 (kg/hr) | 93,473 | 83,587 | −10.6% |
| Reject Gas in Line 149 LHV (KJ/Kg) | 6,887 | 2,735 | |
| Air Compressor Power (KW) | 42,593 | 42,300 | −0.7% |
| Feed Gas Compressor Power (KW) | 5,061 | 4,578 | −9.5% |
| Syngas Compressor Power (KW) | 38,106 | 37,386 | −1.9% |
| Refrigeration Compressor Power (KW) | 17,407 | 17,337 | −0.4% |

As shown in Table 1, indirectly heating the effluent in line 107 from the raw syngas in line 116 (the "modified process") provides a significant reduction of about 10% for both the hydrocarbon feed in line 101 and the steam in line 103. The heat duty or heat required from the primary reformer 105 is reduced by about 9%, which corresponds to a reduction of about 7% in the amount of fuel required to heat the primary reformer 105. The overall energy consumption for the modified process can be reduced to about 6.82 Gcal/Mt from the base energy consumption of about 6.94 Gcal/Mt, which provides a net energy improvement of about 0.12 Gcal/Mt or about 1.7% less energy.

The modified process provides an increase in the effluent temperature introduced via line 112 to the secondary reformer 115, which improves the steam reforming reactions thereby reforming more methane to $H_2$ and CO, thus improving the process efficiency. Transferring some of the heat from the raw syngas in line 116 to the effluent in line 112 results in more moles of the hydrocarbon introduced via line 101 being converted to $H_2$ and CO, which requires less hydrocarbon via line 101 to provide the same amount of $H_2$ and CO in the raw syngas. This allows for either an increase in syngas production or a reduction in the overall throughput, while maintaining the same production of $H_2$ and CO, which allows reduction in equipment sizes, saving capital cost in addition to the reduction in operating costs. Furthermore, the waste gas via line 144 rejected can be reduced by about 11%.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, the term should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing syngas, comprising:
    reforming a hydrocarbon in the presence of steam and one or more first catalysts in a first reaction zone to provide an effluent comprising a portion of the hydrocarbon, carbon monoxide, carbon dioxide, about 8% mol to about 12% mol methane, and hydrogen at a first temperature, wherein the first reaction zone comprises one or more catalyst-containing tubes, and wherein a ratio of steam to the hydrocarbon in the first reaction zone is 2.5 to 3.5;
    indirectly heating the effluent from the first temperature to a second temperature;
    reforming the effluent at the second temperature and at a pressure of about 4,000 kPa to about 5,500 kPa in the presence of one or more oxidants and one or more second catalysts at conditions sufficient to provide a syngas having a temperature of about 1,030° C. or more and comprising hydrogen, carbon monoxide, carbon dioxide, and less than 0.3% mol, dry basis, methane, wherein the syngas is used to indirectly heat the effluent from the first temperature to the second temperature;
    converting at least a portion of the carbon monoxide in the syngas used to indirectly heat the effluent to provide a converted syngas comprising carbon dioxide and 1% mol dry basis or less carbon monoxide;
    removing at least a portion of the carbon dioxide of the converted syngas to provide a lean syngas comprising 1% mol dry basis or less carbon dioxide and carbon monoxide;
    converting at least a portion of any carbon dioxide, carbon monoxide, or both contained in the lean syngas to methane;
    separating at least a portion of the water from the lean syngas;
    separating at least a portion of nitrogen in the lean syngas to provide an ammonia syngas having a hydrogen to nitrogen ratio of about 2.9:1 to about 3.2:1; and
    reacting at least a portion of the hydrogen and nitrogen in the ammonia syngas to provide an ammonia product.

2. The method of claim 1, wherein the first temperature is about 700° C. or more.

3. The method of claim 1, wherein the second temperature is about 850° C. or more.

4. The method of claim 1, wherein the hydrocarbon comprises methane.

5. The method of claim 1, wherein the temperature of the syngas after indirectly heating the effluent from the first temperature to the second temperature is about 880° C. or more.

6. The method of claim 1, wherein heat is indirectly exchanged from the syngas after the syngas is used to indirectly heat the effluent to a condensate to provide high pressure steam.

7. The method of claim 1, wherein reacting at least a portion of the hydrogen and nitrogen in the ammonia syngas to provide an ammonia product occurs in an ammonia converter, the ammonia converter comprising:
    a first shell having two or more discrete catalyst beds disposed therein;
    a second shell disposed about the first shell;
    a first heat exchanger disposed external to the first shell and in fluid communication therewith;
    a second heat exchanger disposed external to the second shell and in fluid communication therewith; and
    a flow path disposed within the first shell, wherein the two or more discrete catalyst beds within the first shell are disposed about the flow path, wherein a first portion of the ammonia syngas is introduced to the first shell and a second portion of the ammonia syngas is introduced to the second shell.

8. The method of claim 1, wherein the effluent comprises about 35% mol to about 39% mol hydrogen, about 4% mol to about 5% mol carbon monoxide, about 6% mol to about 8% mol carbon dioxide, about 8% mol to about 10% mol methane, and about 42% mol to about 47% mol steam.

9. The method of claim 1, wherein the temperature of the hydrocarbon and steam is monotonically increased to the first temperature.

10. The method of claim 1, wherein the syngas has a temperature of about 1,050° C. or more.

11. The method of claim 1, wherein the syngas has a temperature from about 1,030° C. to about 1,050° C.

12. The method of claim 1,
    wherein separating the at least a portion of the nitrogen in the lean syngas to provide the ammonia syngas comprises:
    cooling the lean syngas in a cross-exchanger to obtain a cooled syngas;
    introducing the cooled syngas to a distillation column;
    expanding a liquid bottoms stream from the distillation column through a liquid expander to form a cooled waste fluid;
    rectifying vapor in the distillation column to form an overhead having a reduced nitrogen content;
    cooling the overhead vapor in indirect heat exchange with the cooled waste fluid to form the ammonia syngas.

13. A method for producing syngas, comprising:
    reforming a hydrocarbon in the presence of steam and one or more first catalysts in a first reaction zone to provide an effluent comprising a portion of the hydrocarbon, carbon monoxide, carbon dioxide, about 8% mol to about 12% mol methane, and hydrogen at a first temperature, wherein the temperature of the hydrocarbon and steam is monotonically increased to the first temperature, and wherein a ratio of steam to the hydrocarbon in the first reaction zone is 2.5 to 3.5;
    indirectly heating the effluent at the first temperature to provide an effluent at a second temperature; and
    reforming the effluent at the second temperature and at a pressure of about 4,000 kPa to about 5,500 kPa in the presence of one or more oxidants and one or more second catalysts to provide a syngas, wherein the syngas has a temperature of about 1,030° C. or more and comprises hydrogen, carbon monoxide, carbon dioxide, nitrogen, less than 0.3% mol, dry basis, methane, and water, and wherein the syngas is used to indirectly heat the effluent at the first temperature to the second temperature;
    converting at least a portion of the carbon monoxide in the syngas used to indirectly heat the effluent to provide a converted syngas comprising carbon dioxide and 1% mol dry basis or less carbon monoxide;
    removing at least a portion of the carbon dioxide of the converted syngas to provide a lean syngas comprising 1% mol dry basis or less carbon dioxide and carbon monoxide;

converting at least a portion of any carbon dioxide, carbon monoxide, or both contained in the lean syngas to methane;

separating at least a portion of the water from the lean syngas;

separating at least a portion of the nitrogen in the lean syngas to provide an ammonia syngas having a hydrogen to nitrogen ratio of about 2.9:1 to about 3.2:1; and reacting at least a portion of the hydrogen and nitrogen in the ammonia syngas to provide an ammonia product.

14. The method of claim 13, wherein reacting at least a portion of the hydrogen and nitrogen in the ammonia syngas to provide an ammonia product occurs in an ammonia converter, the ammonia converter comprising:

a first shell having two or more discrete catalyst beds disposed therein;

a second shell disposed about the first shell;

a first heat exchanger disposed external to the first shell and in fluid communication therewith;

a second heat exchanger disposed external to the second shell and in fluid communication therewith; and a flow path disposed within the first shell, wherein the two or more discrete catalyst beds within the first shell are disposed about the flow path, wherein a first portion of the ammonia syngas is introduced to the first shell and a second portion of the ammonia syngas is introduced to the second shell.

15. The method of claim 14, wherein the effluent comprises about 35% mol to about 39% mol hydrogen, about 4% mol to about 5% mol carbon monoxide, about 6% mol to about 8% mol carbon dioxide, about 8% mol to about 10% mol methane, and about 42% mol to about 47% mol steam.

16. The method of claim 13, wherein the first temperature is about 700° C. or more.

17. The method of claim 13, wherein the second temperature is about 850° C. or more.

18. The method of claim 1, wherein the temperature of the syngas after the syngas is used to indirectly heat the effluent is about 860° C. to about 900° C.

19. The method of claim 13, wherein the temperature of the syngas after indirectly heating the effluent from the first temperature to the second temperature is about 880° C.

20. A method for producing syngas, comprising:

reforming a hydrocarbon in the presence of steam and one or more first catalysts comprising about 15 wt % to about 20 wt % nickel in a first reaction zone to provide an effluent comprising a portion of the hydrocarbon, carbon monoxide, carbon dioxide, about 8% mol to about 12% mol methane, and hydrogen at a first temperature, wherein the first reaction zone comprises a plurality of catalyst-containing tubes, each having an inside diameter of about 40 mm to about 115 mm, and wherein a ratio of steam to the hydrocarbon in the first reaction zone is 2.5 to 3.5;

indirectly heating the effluent from the first temperature to a second temperature; and reforming the effluent at the second temperature and at a pressure of about 4,000 kPa to about 5,500 kPa in the presence of one or more oxidants and one or more second catalysts comprising about 10 wt % to about 15 wt % nickel in a second reaction zone at conditions sufficient to provide a syngas having a temperature greater of about 1,050° C. or more and comprising hydrogen, carbon monoxide, carbon dioxide, and less than 0.3% mol, dry basis, methane, wherein the syngas is used to indirectly heat the effluent from the first temperature to the second temperature;

indirectly exchanging heat from the syngas after the syngas is used to indirectly heat the effluent to a condensate to provide high pressure steam;

converting at least a portion of the carbon monoxide in the syngas used to indirectly heat the condensate to provide a converted syngas comprising carbon dioxide 1% mol dry basis or less carbon monoxide;

removing at least a portion of the carbon dioxide of the converted syngas to provide a lean syngas comprising 1% mol dry basis or less carbon dioxide and carbon monoxide;

converting at least a portion of any carbon dioxide, carbon monoxide, or both contained in the lean syngas to methane;

separating at least a portion of the water from the lean syngas;

separating at least a portion of nitrogen in the lean syngas to provide an ammonia syngas having a hydrogen to nitrogen ratio of about 2.9:1 to about 3.2:1; and reacting at least a portion of the hydrogen and nitrogen in the ammonia syngas to provide an ammonia product.

21. The method of claim 20, wherein the one or more second catalysts further comprises one or more noble metals.

22. The method of claim 20, wherein the temperature of the syngas after the syngas is used to indirectly heat the effluent is about 880° C. to about 900° C.

23. The method of claim 20, wherein the effluent comprises from about 35% mol to about 39% mol hydrogen, from about 4% mol to about 5% mol carbon monoxide, from about 6% mol to about 8% mol carbon dioxide, from about 8% mol to about 10% mol methane, and from about 42% mol to about 47% mol steam.

* * * * *